Nov. 17, 1959 J. S. NABER ET AL 2,913,673

SIGNAL GENERATING DEVICE

Filed July 22, 1955 2 Sheets-Sheet 1

INVENTORS:
JOSEPH S. NABER &
ANDRZEJ B. PRZEDPELSKI
BY
Marshall A. Burmeister
ATT'Y Nov. 17, 1959 J. S. NABER ET AL 2,913,673

SIGNAL GENERATING DEVICE

Filed July 22, 1955 2 Sheets-Sheet 2

INVENTORS:
JOSEPH S. NABER &
ANDRZEJ B. PRZEDPELSKI
BY
Marshall A. Burmeister
ATT'Y

United States Patent Office 2,913,673
Patented Nov. 17, 1959

2,913,673

SIGNAL GENERATING DEVICE

Joseph S. Naber, Wheeling, and Andrzej B. Przedpelski, Forest Park, Ill., assignors to A.R.F. Products, River Forest, Ill., a corporation of Illinois Application July 22, 1955, Serial No. 523,660
6 Claims. (Cl. 331—159)

Figure 1:
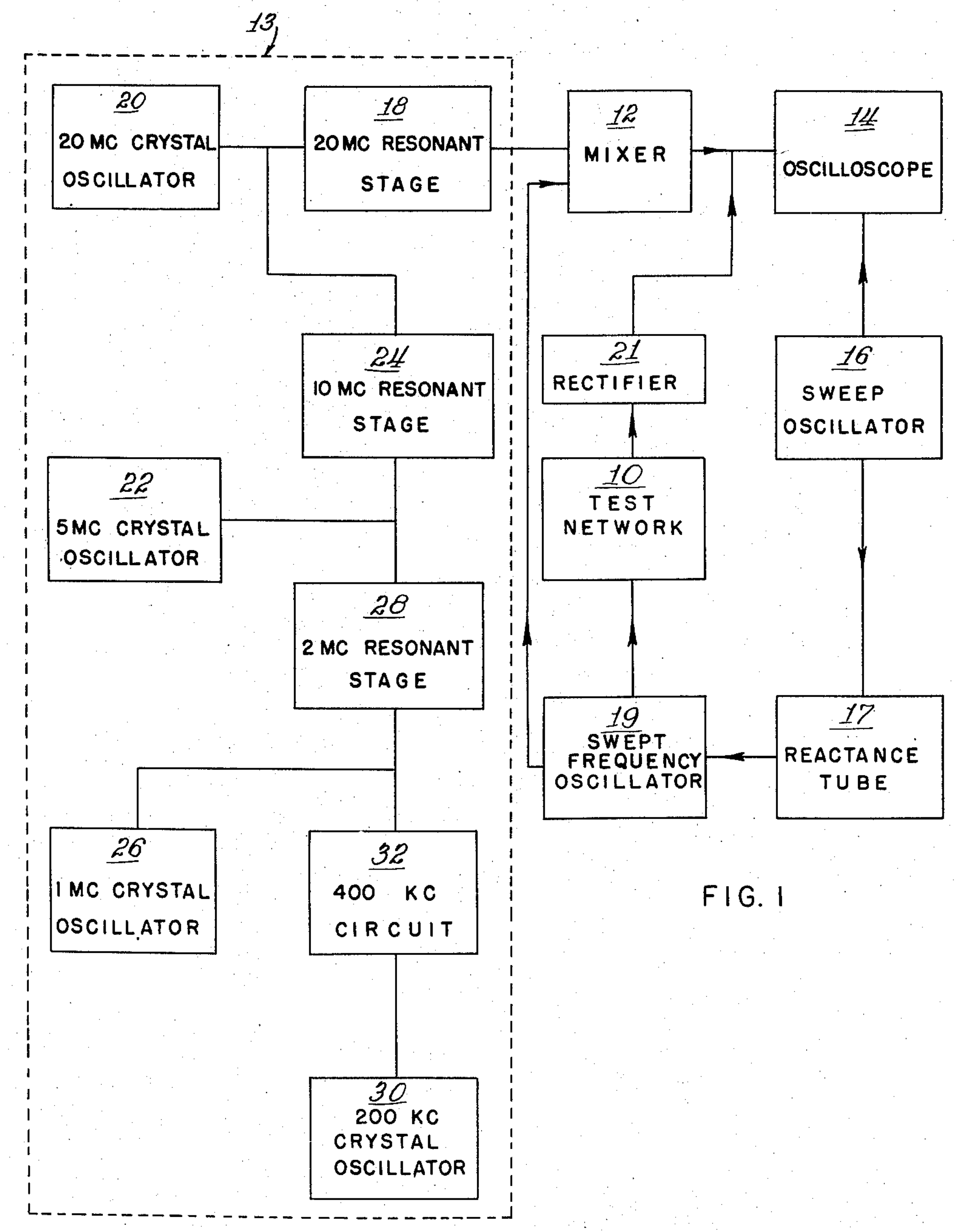

The present invention relates to devices for generating electrical signals, particularly devices for generating a plurality of signals spaced by intervals throughout a frequency range, called spectrum generators.

It is often desirable to determine the frequency characteristics of a network. One way to accomplish this is to excite the network with a frequency modulated oscillator, and impress the response of the network upon an oscilloscope. If the horizontal sweep frequency of the oscilloscope is the same as the modulation frequency of the frequency modulated oscillator, the response of the network and the oscilloscope will be synchronized. The frequency response to the network may then be directly determined by impressing the signals from a spectrum generator upon the oscilloscope and synchronizing the horizontal sweep frequency of the oscilloscope with the spectrum generator to give the proper number of spectral signals during the sweep period.

A spectrum generator may also be used to calibrate a variable frequency oscillator. To do so, the oscillator is successively beat against a number of signals from the spectrum generator, and the position of the frequency varying means noted. Since the frequency of the oscillator is generally known to be within a frequency range, and the interval between adjacent spectral signals is known, each of the beats occurs at a known frequency.

Unless the signals from the spectrum generator are separated by relatively large frequency intervals, it is difficult in practice to determine which of the spectral signals is being beat against the variable frequency oscillator. It is therefore a general object of the present invention to provide a spectrum generator with stepwise selection of the frequency interval between adjacent spectral signals.

The inventors accomplish this object by providing a plurality of oscillators of different fundamental frequencies connected in a novel circuit. Only one of the oscillators is actuated at a time, thus producing a radio frequency spectrum in which the frequency interval between adjacent spectral signals is equal to that of the fundamental frequency of the particular oscillator in operation.

Any conventional circuit devised to employ a plurality of oscillators and switching means to actuate and connect one of a plurality of oscillators into a following circuit would require a complicated switching circuit, since in general, both the power supply and the radio frequency output of at least two oscillators must be connected and disconnected in each switching operation in order to prevent an oscillator which is not in operation from interfering with the operation of the oscillator which is in operation. It is therefore an object of the present invention to provide an electrical circuit using a plurality of oscillators which may be switched into operation merely by applying power to any one of the oscillators.

Further, conventional circuits which employ a plurality of oscillators are cumbersome in that each of the circuits must be complete in itself. It is therefore a further object of the present invention to provide a simplified circuit which employs a plurality of oscillators, and in particular, to provide a spectrum generator using a plurality of oscillators which is simplified over conventional circuits using a plurality of oscillators.

Further, it is an object of the present invention to provide an oscillator which is particularly adapted for use in circuits employing a plurality of oscillators, particularly spectrum generators.

Figure 2:
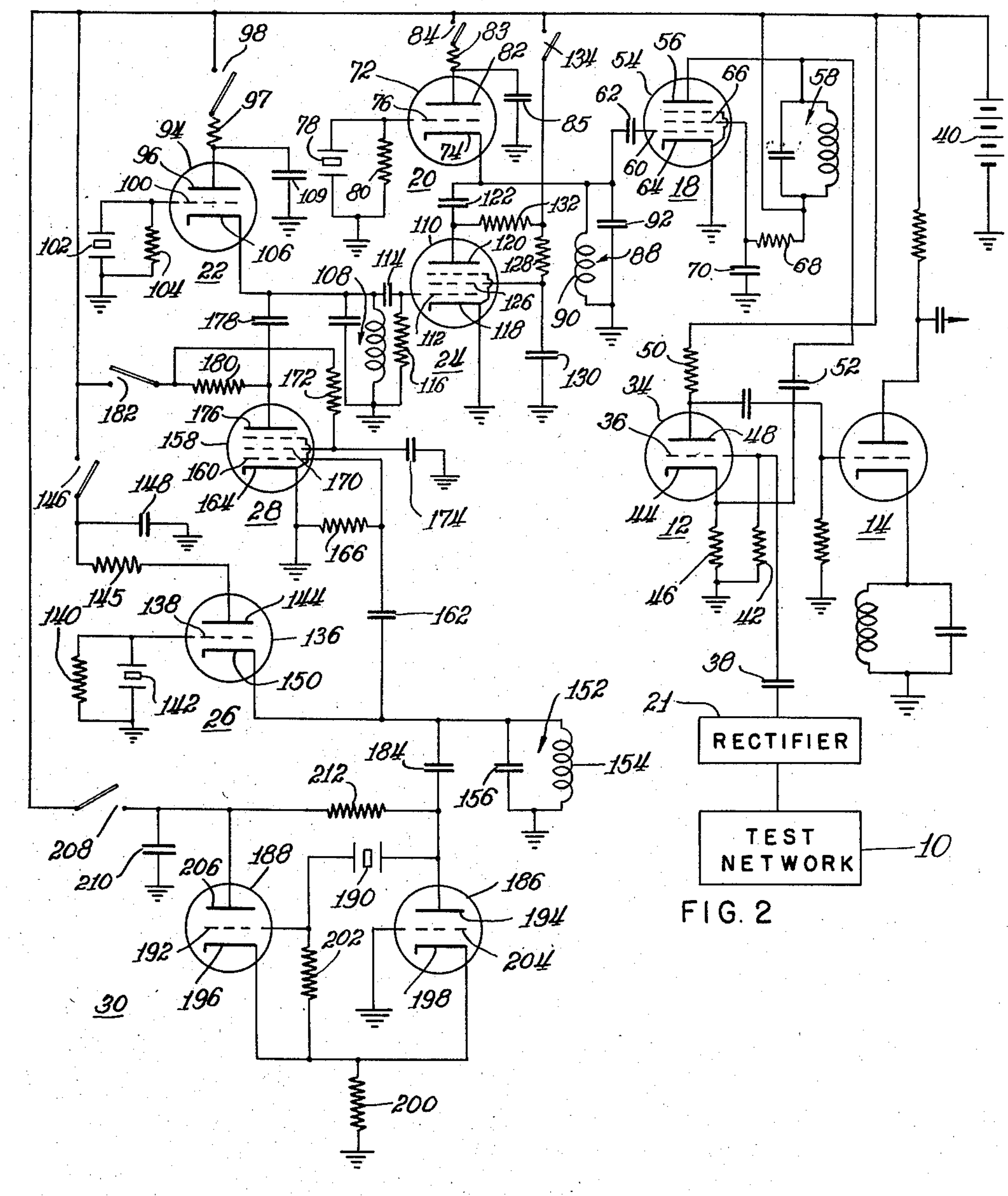

These and further objects of the present invention will be more readily understood from a further reading of the present disclosure, particularly when taken in the light of the drawings, in which:

Figure 1 is a block diagram of a spectrum generator constructed according to the teachings of the present invention; and Figure 2 is a schematic electrical diagram of the spectrum generator, mixer and a portion of the oscilloscope illustrated in Figure 1.

In the figures, a spectrum generator 13 constructed according to the teachings of the present invention is connected to the input of a mixer 12. The output of the mixer 12 is connected to a display in the form of a cathode ray oscilloscope 14, and a saw tooth wave sweep oscillator 16 is connected to the oscilloscope 14 to provide horizontal sweeping at a constant frequency. The sweep oscillator 16 is also electrically connected to a reactance tube circuit 17 which is in turn electrically connected to a "swept frequency" oscillator 19.

The swept frequency oscillator 19 is connected to the input of the mixer 12, so that the momentary beat between the signal from the swept frequency oscillator 19 and any one of the line spectrum frequencies produces a short vertical impulse on the cathode ray oscillograph 14.

The swept frequency oscillator 19 is also connected to the test network, designated 10, and a rectifier 21 is connected between the test network 10 and the vertical deflection terminals of the oscilloscope 14.

As a result of this construction, the rectified response signal from the test network 10 appears as a vertical deflection in the form of a curve upon the screen of the oscilloscope 14. Since the frequency separation of each of the spectral lines is known, the frequency range of the curve from the test network 10 is determined.

If the frequency modulated oscillator 19 has not been calibrated, this can be done by removing the test network 10 and rectifier 21 from the circuit and deactivating the reactance tube circuit 17. The unmodulated signal from the oscillator 19 is then beat against one or more signals from the spectrum generator 13 by tuning the oscillator 19 to the frequency of these signals, thus frequency calibrating the oscillator 19.

The spectrum generator 13 employs the "method of successive modulations" to produce the desired spectral signals. With this method, pulses forming the spectral signals are generated by a driving stage having a tuned circuit with a resonant frequency above the frequency of the lowest spectral signal to be generated in order to provide a pulse with a sufficient spectral distribution to reach the upper end of the required spectrum band. The desired interval between spectral signals is obtained by modulating the driving stage with a modulation frequency equal to the interval between adjacent spectral signals. The modulating signal itself may be generated in the same manner by a stage having a resonant circuit with a frequency integrally related to the resonant frequency of the tuned circuit of the driving stage.

The spectrum generator 13 has a 20 megacycle resonant stage 18 which generates the spectral signals and operates in all cases, and the resonant stage 18 is coupled to the input of the mixer 12. When the spectral lines are to be separated by a frequency of 20 megacycles, a 20 megacycle crystal oscillator 20 is energized, the oscillator 20 being coupled to the input of the 20 megacycle resonant stage 18. These are the only two stages of the spectrum generator 13 which are in operation under this particular set of conditions.

In the event that a 5 megacycle separation between spectral signals is desired, the 20 megacycle crystal oscillator 20 is deactivated, and a 5 megacycle crystal oscillator 22 is energized. The 5 megacycle crystal oscillator 22 is coupled to the input of the 20 megacycle resonant stage 18 through a 10 megacycle stage 24, which is also energized. Under these conditions, the 5 megacycle crystal oscillator produces pulses in the form of damped wave trains in the output circuits of the 10 megacycle stage 24 and 20 megacycle stage 18, and these pulses have a repetition rate of 5 megacycles. In this manner, pulses having the shape of the 20 megacycle stage 18, and hence desired spectral distribution, are produced with a repetition rate of 5 megacycles.

In like manner, a 1 megacycle separation between spectral signals may be obtained by actuating a 1 megacycle crystal oscillator 26 and deactuating the 5 megacycle crystal oscillator 22 and the 20 megacycle crystal oscillator 20. The 1 megacycle crystal oscillator 26 is coupled to the input of the resonant 10 megacycle stage 24 through a resonant 2 megacycle stage 28, which is also energized. Also, a spectral signal separation of 200 kilocycles may be obtained in the same manner by actuating a 200 kilocycle crystal oscillator 30 and a resonant 400 kilocycle circuit 32, and deactuating the crystal oscillators 20, 22 and 26.

The schematic electrical circuit diagram for the spectrum generator, mixer, and a portion of the oscilloscope appears in Figure 2. Since the oscilloscope 14, sweep oscillator 16, reactance tube circuit 17, swept frequency oscillator 19 and rectifier 21 are conventional, their circuits have not been shown. The mixer 12 utilizes a vacuum tube 34 in a conventional mixing circuit, the test network 10 being connected to the control grid 36 of the vacuum tube 34 through rectifier 21 and a condenser 38. The control grid 36 is connected to the negative terminal of a suitable power source, such as battery 40, through a resistor 42. The cathode 44, or return electrode, of vacuum tube 34 is also connected to the negative terminal of the power source 40 through a resistor 46. The plate 48 of vacuum tube 34 is connected to the positive terminal of the power source 40 through a plate resistor 50. The output signal from the resonant 20 megacycle stage 18 is connected to the cathode 44 of vacuum tube 34 through a condenser 52.

The 20 megacycle resonant stage 18 is a class C amplifier and has a vacuum tube 54 with a plate 56 connected to a parallel resonant tank circuit 58. The end of the tank circuit opposite to the plate 56 is connected to the positive terminal of the power source 40. Vacuum tube 54 also has a control grid 60 which is coupled to the 20 megacycle crystal oscillator 20 and to the resonant 10 megacycle stage 24 through a coupling condenser 62. The cathode 64 of vacuum tube 54 is connected to the negative terminal of the power source 40, and the screen grid 66 of vacuum 54 is connected to the positive terminal of the power source 40 through a dropping resistor 68, the screen grid also being by-passed to the negative terminal of the power source 40 by condenser 70. The tank circuit 58 of the resonant 20 megacycle stage 18 is tuned to resonate at 20 megacycles.

The 20 megacycle crystal oscillator 20 uses a vacuum tube 72 with a cathode 74 which is coupled into the resonant 20 megacycle stage 18. The tube 72 has a control grid 76, and a crystal 78 having a resonant frequency of 20 megacycle is connected between the grid 76 and the negative terminal of the power source 40. The crystal 78 has connected in parallel therewith a resistor 80. The plate 82 of vacuum tube 72 is connected to the positive terminal of the power source through a resistor 83 and switch 84, and the plate 82 is also by-passed to the negative terminal of the power source by a condenser 85. The cathode 74 of the 20 megacycle crystal oscillator 20 is also connected to the negative terminal of the power source 40 through a tank circuit 88 which includes a coil 90 connected in parallel with the condenser 92. The tank circuit 88 is not tuned to the resonant frequency of the crystal 78, but to a frequency lower than the resonant frequency of the crystal 78. In the particular construction, the tank circuit 88 is tuned to a frequency of 10 megacycles, where the resonant frequency of the crystal 78 is 20 megacycles. Hence at the frequency of 20 megacycles, the tank circuit 88 merely presents a capacitive reactance to the circuit.

The 5 megacycle crystal oscillator 22 is constructed in a manner similar to the 20 megacycle crystal oscillator 20. The 5 megacycle crystal oscillator 22 has a vacuum tube 94 with a plate 96 connected to the positive terminal of the power source 40 through a resistor 97 and switch 98. Vacuum tube 94 also has a grid 100 connected to the negative terminal of the power source 40 through a crystal 102 connected in parallel with the resistor 104, the crystal 102 having a resonant frequency of 5 megacycles. Vacuum tube 94 also has a cathode 106 connected to the negative terminal of the power source through a tank circuit 108 having a resonant frequency below that of the resonant frequency of the crystal 102, in the particular construction the resonant frequency being 2 megacycles. The plate 96 of vacuum tube 94 is also by-passed to the negative terminal of the power source 40 by condenser 109.

The 5 megacycle signal produced by the 5 megacycle oscillator 22 is coupled to the input of the 20 megacycle resonant stage through the 10 megacycle resonant stage 24. The 10 megacycle resonant stage 24 has a vacuum tube 110 with a control grid 112 which is coupled to the cathode 106 of tube 94 of the 5 megacycle oscillator through a condenser 114. The grid is also connected to the negative terminal of the power source through a grid resistor 116. The cathode 118 of vacuum tube 110 is also connected to the negative terminal of the power source 40. The vacuum tube 110 has a plate 120 which is coupled through a coupling condenser 122 to the cathode 74 of vacuum tube 72. In addition, vacuum tube 110 has a screen grid 126 connected to the positive terminal of the power source 40 through a resistor 128 and to the negative terminal of the power source 40 through a by-pass condenser 130. The plate 120 of vacuum tube 110 is also connected to the positive terminal of the power source through a plate resistor 132 connected in series with a switch 134.

The 1 megacycle crystal oscillator 26 is also of similar construction to the 20 megacycle oscillator 20. It has a vacuum tube 136 with a grid 138 connected to the negative terminal of the power source 40 through parallel connected resistor 140 and crystal 142, the resonant frequency of the crystal 142 being 1 megacycle. Vacuum tube 136 also has a plate 144 which is connected to the positive terminal of the power source 40 through a resistor 145 and switch 146 and to the negative terminal of the power source 40 through a by-pass condenser 148. Vacuum tube 136 has a cathode, or return electrode, 150 which is connected to a tank circuit 152 having a parallelly connected coil 154 and condenser 156, the opposite end of the tank circuit 152 being connected to the negative terminal of the power source 40. The resonant frequency of the tank circuit 152 in the particular construction is 400 kilocycles, where the resonant frequency of the crystal 142 is 1 megacycle.

The 1 megacycle crystal oscillator 26 is coupled to the 10 megacycle resonant stage 24 through a 2 megacycle resonant stage 28. The 2 megacycle resonant stage 28 has a vacuum tube 158 with a control grid 160 coupled to the cathode 150 of vacuum tube 136 through a condenser 162. Vacuum tube 158 also has a cathode 164 connected to the negative terminal of the power source, and the grid 160 of vacuum tube 158 is also connected to the negative terminal of the power source through a grid resistor 166. Vacuum tube 158 also has a screen grid 170 connected to the positive terminal of the power source 40 through a resistor 172 and to the negative terminal of the power source through a condenser 174. Vacuum tube 158 is also provided with a plate 176 which is coupled to the cathode 106 of the 5 megacycle oscillator 22 through a coupling condenser 178, the plate 176 also being connected to the positive terminal of the power source 40 through a plate resistor 180 and a switch 182 connected in series. It is to be noted, that the tank circuit 108 serves both as an impedance for the 5 megacycle crystal oscillator and as a resonant tank circuit for the resonant 2 megacycle stage 28.

The 200 kilocycle oscillator 30 is coupled through condenser 184 to the cathode 150 of the 1 megacycle crystal oscillator 26. It utilizes two tubes 186 and 188 connected in an oscillator circuit, a 200 kilocycle crystal 190 being connected between the grid 192 of vacuum tube 188 and the plate 194 of vacuum tube 186. The cathodes 196 of vacuum tube 188 and 198 of vacuum tube 186 are interconnected and connected to the negative terminal of the power source 40 through a resistor 200. The grid 192 of vacuum tube 188 is also connected to the cathodes 196 and 198 through a resistor 202. The grid 204 of vacuum tube 186 is directly connected to the negative terminal of the power source. Vacuum tube 188 has a plate 206 which is connected to the positive terminal of the power source 40 through a switch 208, and the plate 206 is connected to the negative terminal of the power source 40 through a by-pass condenser 210. The plate 194 of vacuum tube 186 is also connected to the positive terminal of the power source through resistor 212 and the switch 208 connected in series.

In order to produce a spectrum with 20 megacycles separations between adjacent spectral signals, only switch 84 of the 20 megacycle crystal oscillator 20 is closed, the other switches 98, 134, 146, 182 and 208 being open. Under these conditions, the signal appearing in the mixer will have a repetition rate of 20 megacycles. If it is desired to have 5 megacycles separation between spectral signals, switch 84 is open, and switches 98 and 134 closed, switches 146, 182 and 208 being open. As a result, a 5 megacycle signal is produced by the 5 megacycle crystal oscillator 22 which modulates the 10 megacycle stage 24 to produce a wave with alternate pulses of lower value.

The grid 60 of vacuum tube 54 is biased negatively to respond only to the larger first pulse of the wave appearing across the tank circuit 88, so that the repetition rate achieved is that of the oscillator 22.

When switches 84, 98, 208 and 214 are open and switches 146, 182 and 134 are closed, oscillator 26 will be operating to produce 1 megacycle separations between spectral signals. Here again alternate pulses from the resonant 2 megacycle stage 28 are of smaller amplitude, and the grid 112 of vacuum tube 110 of the resonant 10 megacycle stage 24 is negatively biased to respond only to the larger of these pulses. This results in a damped wave train of 10 megacycle frequency and 1 megacycle repetition rate appearing across the tank circuit 88. Since the 20 megacycle resonant stage 18 is biased to respond only to the first pulse of this damped wave train, the output of the spectrum generator 13 will be a damped wave train with a frequency of 20 megacycles and a repetition rate of 1 megacycle. By placing the proper negative bias on the grid 60 of the mixer tube 54, only the first pulse of this wave train will appear in the output of the mixer.

A spectrum with a 200 kilocycle separation between spectral signals is obtained when switches 208, 214, 182 and 134 are closed and switches 146, 98 and 84 are open. A damped wave train with a frequency of 20 megacycle and a repetition rate of 200 kilocycle is impressed upon the grid 60 of the mixer tube 56 under these conditions in the same manner described above.

It is to be noted that since the tank circuits 88, 108 and 152 in the cathode circuits of the 20 megacycle crystal oscillator 20, 5 megacycle crystal oscillator 22 and 1 megacycle crystal oscillator 26, respectively, appear in the oscillator circuits as reactances, these crystal oscillators operate essentially as modified Colpitts oscillators, a crystal being substituted for the resonant tank circuits of the self-excited Colpitts oscillator. It is also to be noted, that these tank circuits 88, 108 and 152 which appear as reactances to the oscillators, appear as resonant tank circuits to the class C driving stages immediately preceding the particular oscillator. As a result of this fact, the spectrum generator circuit has been greatly simplified since separate reactances for the oscillators have been eliminated. Further, it is to be noted that the spectrum generator permits stepwise selection of the interval between spectral signals without the necessity of switching any radio frequency circuits, only power supply circuits being switched in changing the spectral signal interval. This simplifies construction and assures a minimum of maintenance.

The foregoing disclosure has been directed to a specific construction of the present invention. The man skilled in the art will readily devise many other constructions and embodiments of the inventors' invention. It is therefore intended that the scope of the present invention be not limited to the specific construction described above, rather only by the appended claims.

We claim:

1. An electrical circuit comprising, in combination, an oscillator having a vacuum tube with a plate, grid, and return electrode, a source of voltage having a positive terminal connected to the plate and a negative terminal connected to the return electrode of the vacuum tube, a crystal having a fixed resonant frequency of oscillation electrically connected across the grid and return electrode of the vacuum tube to impress a wave of fixed frequency upon the current flowing through said tube, an electrically conducting impedance element having a resonant frequency different than that of the crystal connected between the return electrode and the negative terminal of the power source, and a source of radio frequency energy having the same frequency as the resonant frequency of the element coupled electrically to the element.

2. An electrical circuit comprising, in combination, an oscillator having a vacuum tube with a plate, grid, and return electrode, a source of voltage having a positive terminal connected to the plate and a negative terminal connected to the return electrode of the vacuum tube, a crystal having a fixed resonant frequency of oscillation electrically connected across the grid and return electrode of the vacuum tube to impress a wave of fixed frequency upon the current flowing through said tube, a tank circuit having a coil and condenser connected in parallel between the return electrode and the negative terminal of the power source, the frequency of resonance of said tank circuit being below that of the resonant frequency of crystal, a class C amplifier having a vacuum tube with a plate, grid and return electrode, the plate of said amplifier being coupled to the cathode of the oscillator, and means to impress a wave having a frequency component equal to that of the resonant frequency of the tank circuit across the grid and return electrode of the class C stage.

3. An electrical circuit comprising, in combination, an oscillator having a vacuum tube with a plate, grid, and return electrode, a source of voltage having a positive terminal connected to the plate and a negative terminal connected to the return electrode of the vacuum tube, a crystal having a fixed resonant frequency of oscillation electrically connected across the grid and return electrode of the vacuum tube to impress a wave of fixed frequency upon the current flowing through said tube, a tank circuit having a coil and condenser connected in parallel between the return electrode and the negative terminal of the power source, the frequency of resonance of said tank circuit being below that of the resonant frequency of the crystal, a class C amplifier having a vacuum tube with a plate, grid and return electrode, the plate of said tube being coupled to the cathode of the oscillator, means to impress a wave having a frequency component equal to that of the resonant frequency of the tank circuit across the grid and return electrode of the amplifier, and a second class C amplifier having an input circuit electrically coupled to the return electrode of the oscillator.

4. An electronic circuit comprising a vacuum tube having a plate, control grid and return electrode, a source of direct current power having a positive terminal connected to the plate of the vacuum tube and a negative terminal, an impedance element having a frequency of resonance connected to the return electrode and to the negative terminal of the source of power, a crystal having a resonant frequency an integral multiple above that of the tank circuit connected to the control grid of the vacuum tube and to the negative terminal of the source of power, and an amplifier having an output circuit coupled to the return electrode of the oscillator and an input circuit coupled to a source of energy at a frequency with a component equal to the resonant frequency of the impedance element.

5. An electrical circuit comprising, in combination, an oscillator having a vacuum tube with a plate, grid, and return electrode, a source of voltage having a positive terminal connected to the plate and a negative terminal connected to the return electrode of the vacuum tube, a crystal having a fixed resonant frequency of oscillation electrically connected across the grid and return electrode of the vacuum tube to impress a wave of fixed frequency upon the current flowing through said tube, a tank circuit having a coil and condenser connected in parallel between the return electrode and the negative terminal of the power source, the frequency of resonance of said tank circuit being below that of the resonant frequency of the crystal, a class C amplifier having a vacuum tube with a plate, grid and return electrode, the plate of said tube being coupled to the return electrode of the oscillator, means to impress a wave having a frequency component equal to that of the resonant frequency of the tank circuit across the grid and return electrode of the amplifier, a second class C amplifier having a vacuum tube with a plate, grid and return electrode, the grid of said tube being coupled to the return electrode of the oscillator and negatively biased to respond only to pulses above a threshold value.

6. An electronic circuit comprising a vacuum tube having a plate, control grid and return electrode, a source of direct current power having a positive terminal connected to the plate of the vacuum tube and a negative terminal, an impedance element having a frequency of resonance connected to the return electrode and to the negative terminal of the source of power, a crystal having a resonant frequency an integral multiple above that of the impedance element connected to the control grid of the vacuum tube and to the negative terminal of the source of power, and a class C amplifier having a vacuum tube with a plate, grid and return electrode, the impedance element being connected between the plate and return electrode of said amplifier.

References Cited in the file of this patent

UNITED STATES PATENTS

| | | |
|---|---|---|
| 2,066,027 | Braaten | Dec. 29, 1936 |
| 2,186,980 | Lowell | Jan. 16, 1940 |
| 2,411,166 | Olson | Nov. 19, 1946 |
| 2,455,824 | Tellier et al. | Dec. 7, 1948 |
| 2,498,809 | Haner | Feb. 28, 1950 |